United States Patent [19]

Acampora et al.

[11] Patent Number: 4,730,305
[45] Date of Patent: Mar. 8, 1988

[54] FAST ASSIGNMENT TECHNIQUE FOR USE IN A SWITCHING ARRANGEMENT

[75] Inventors: Anthony Acampora, Freehold; Kai Y. Eng, Red Bank, both of N.J.

[73] Assignee: American Telephone and Telegraph Company, AT&T Bell Laboratories, Murray Hill, N.J.

[21] Appl. No.: 850,778

[22] Filed: Apr. 11, 1986

[51] Int. Cl.⁴ .............................................. H04Q 11/04
[52] U.S. Cl. .......................................... 370/60; 370/61
[58] Field of Search ......................... 370/60, 61, 94, 99

[56] References Cited

U.S. PATENT DOCUMENTS

| | | | |
|---|---|---|---|
| 4,232,266 | 11/1980 | Acampora | 370/79 |
| 4,271,506 | 6/1981 | Broc et al. | 370/89 |
| 4,381,562 | 4/1983 | Acampora | 370/97 |
| 4,425,640 | 1/1984 | Philip et al. | 370/58 |
| 4,425,641 | 1/1984 | French et al. | 370/64 |
| 4,500,986 | 2/1985 | Carver | 370/58 |
| 4,512,012 | 4/1985 | Sampei et al. | 370/66 |
| 4,512,014 | 4/1985 | Binz et al. | 370/84 |
| 4,546,470 | 10/1985 | Naylor et al. | 370/97 |
| 4,566,095 | 1/1986 | Devault et al. | 370/60 |

OTHER PUBLICATIONS

Pfannschmidt, Interntl. Zurich Seminar on Digital Comm., 9-11 Mar. 1986, Zurich, Switzerland, pp. C3.1-C3.6.
Demange, IBM Tech. Discl. Bull., vol. 26, No. 1, Jun. 1983, pp. 267-268.
Campanella et al., Intl. Jrnl. Satellite Comm., vol. 1, No. 2, Oct.-Dec. 1983, pp. 97-111.
Bongiovanni et al., IBM Tech. Discl. Bull., vol. 26, No. 8, Jan., 1984, pp. 4344-4348.
Gopal et al., IEEE Trans. Comm., vol. COM-33, No. 6, Jun. 1985, pp. 497-501.

Primary Examiner—Douglas W. Olms
Assistant Examiner—James E. Busch
Attorney, Agent, or Firm—Erwin W. Pfeifle

[57] ABSTRACT

The present invention relates to a fast packet assignment technique, and a TDMA or FDMA multi-port switching arrangement for implementing such technique. In the present technique, the total traffic in a two-dimensional traffic matrix (T) from and to each of N remote service areas, regardless of destination or origination, is totaled to form separate input (R) and output (S) traffic vectors, respectively. Non-conflicting assignments are then made from these vectors for each packet or channel available during a predetermined time period while also providing the capability of substantially reducing multi-path or antenna sidelobe interference. An M×M switch (16) is designed to implement such technique which directs C input packets from M inputs ($20_{1-M}$) into separate memory locations ($Z_{ij}$). During the time period of the next C input packets, the M×M switch directs the presently stored packets to the proper ones of M outputs ($27_{1-M}$) at the appropriate time for transmission in the proper packet or channel to the destined remote service areas. In accordance with the present technique and switch, the M packets concurrently directed from memory to the M output ports can comprise more than one packet from a particular service area to other separate service areas.

10 Claims, 7 Drawing Figures

FIG. 4

|  | | | | | | |
|---|---|---|---|---|---|---|
| GROUP 1 | ②<br>2<br>1 | ①<br>2<br>1 | 0<br>②<br>1 | 0<br>①<br>1 | 0<br>0<br>①✱ | 0<br>0<br>0 |
| GROUP 2 | ⑤✱<br>2<br>③ ⇒ | ④✱<br>②<br>2 ⇒ | ③✱<br>1<br>② ⇒ | ②✱<br>①<br>1 ⇒ | ①✱<br>0<br>①✱ ⇒ | 0<br>0<br>0 |
| GROUP 3 | 4<br>4<br>②  | 3<br>④✱<br>① | ③✱<br>③✱<br>0 | ②✱<br>②✱<br>0 | ①✱<br>①✱<br>0 | 0<br>0<br>0 |

FIG. 5

|  | ← 1 FRAME → | |
|---|---|---|
| RECEIVER 1 | 1 \| 1 \| 2 \| 2 \| 3 | } GROUP 1 |
| RECEIVER 2 | 4 \| 4 \| 4 \| 4 \| 4 | } GROUP 2 |
| RECEIVER 3 | 6 \| 5 \| 6 \| 5 \| 6 |  |
| RECEIVER 4 | 7 \| 8 \| 7 \| 7 \| 7 | } GROUP 3 |
| RECEIVER 5 | 9 \| 9 \| 8 \| 8 \| 8 |  |

FAST ASSIGNMENT TECHNIQUE FOR USE IN A SWITCHING ARRANGEMENT

TECHNICAL FIELD

The present invention relates to a fast packet assignment technique for use in, for example, a time-division-multiple-access (TDMA) or a frequency-division-multiple-access (FDMA) multi-port switching arrangement. More particularly, for a TDMA switching arrangement, the total traffic from and to each of N remote service areas, regardless of destination or origination, is totaled to provide 2 overall traffic vectors (inbound and outbound). M concurrent transmission assignments are made from each overall traffic vector for each time slot period of a TDMA frame by extracting M non-zero elements from the elements of each overall vector, where $M<N$, to effectively provide a global time slot interchange arrangement where more than one element from a service area can be concurrently transmitted to two separate service areas.

DESCRIPTION OF THE PRIOR ART

Various techniques or algorithms have been used with specifically designed switching arrangements to direct TDMA incoming messages to the appropriate outputs of the associated switching arrangement. In this regard, see, for example, U.S. Pat. Nos. 4,232,266 and 4,381,562 issued to A. Acampora on Nov. 4, 1980, and Apr. 26, 1983, respectively, and the article by G. Bongiovanni et al. in the *IBM Technical Disclosure Bulletin*, Vol. 26, No. 8, January 1984, at pages 4344–4348. A typical time-space-time switching arrangement for directing multiple packets of information through a switch is disclosed, for example, in U.S. Pat. No. 4,512,012 issued to T. Sampei et al. on Apr. 16, 1985. All of the above techniques and switching arrangements use a technique or algorithm which assigns messages through the switching arrangement using elements within a two-dimensional matrix. With such techniques or algorithms, only one message unit or packet associated with any non-zero element of a service area in the two-dimensional traffic matrix is directed through the switching arrangement along with only one message unit or packet associated with each of the other service areas at any instant of time to provide a maximum throughput of a switching arrangement and is, therefore, limiting. The problem remaining in the prior art is to provide a fast assignment technique, and a TDMA or FDMA multi-port switching arrangement for implementing such technique, that approximates a global time slot or channel interchange arrangement by not using a technique that confines itself primarily to extracting single messages or packets from any of the individual non-zero elements associated with any service area within a two-dimensional traffic matrix for assignment of transmissions through the switching arrangement.

SUMARY OF THE INVENTION

The problem in the prior art has been solved in accordance with the present invention which relates to (a) a fast assignment technique and (b) a multi-port switching arrangement capable of implementing such fast assignment technique which is disposed in, for example, a base station of a time-division-multiple-access (TDMA) or frequency-division-multiple-access (FDMA) system. More particularly, in the present fast assignment technique, the total traffic in a two-dimensional traffic matrix from or to each of N remote service areas, regardless of destination or origination, is totaled to form a separate one of 2 overall traffic vectors (one inbound, one outbound). In accordance with the present invention, for an exemplary $M \times M$ switch in a TDMA system that includes C time slots/frame, an assignment of M packet or message units from the N traffic elements to the paths through the $M \times M$ switch during each time slot period is made by extracting M non-zero elements from the totaled vector to effectively provide a global time slot or channel interchange arrangement within the $M \times M$ switch. Within the M non-zero elements selected from the N vector elements, one or more packet or message unit associated with a particular one of the N areas can be arbitrarily assigned from a vector total for concurrent transmission through the $M \times M$ switch to two different service areas.

It is an aspect of the present invention to provide an $M \times M$ switching arrangement which directs a first group of C information packets received at each of M input ports during a first time period into separate first storage locations. During a next second time period, a second group of C information packets from each of the M input ports is stored in separate second storage locations. Concurrently therewith, the first group of C information packets from each of the M input ports is directed out of the first storage locations in a parallel manner at any instant of time such that no more than M information packets are concurrently transferred into M separate predetermined output lines, one associated with each of M output ports for transmission to remote service areas. The no more than M information packets concurrently transferred can comprise at least two information packets from any one of the M input ports.

Other and further aspects of the present invention will become apparent during the course of the following description and by reference to the accompanying drawings.

BRIEF DESCRIPTION OF THE DRAWINGS

Referring now to the drawings in which like numerals represent like parts in the several views:

FIG. 4 is an exemplary vector reduction technique according to the present invention;

FIG. 5 illustrates the time slot assignments within the frames resulting from the exemplary vector reduction technique shown in FIG. 4;

DETAILED DESCRIPTION

Figure 1:
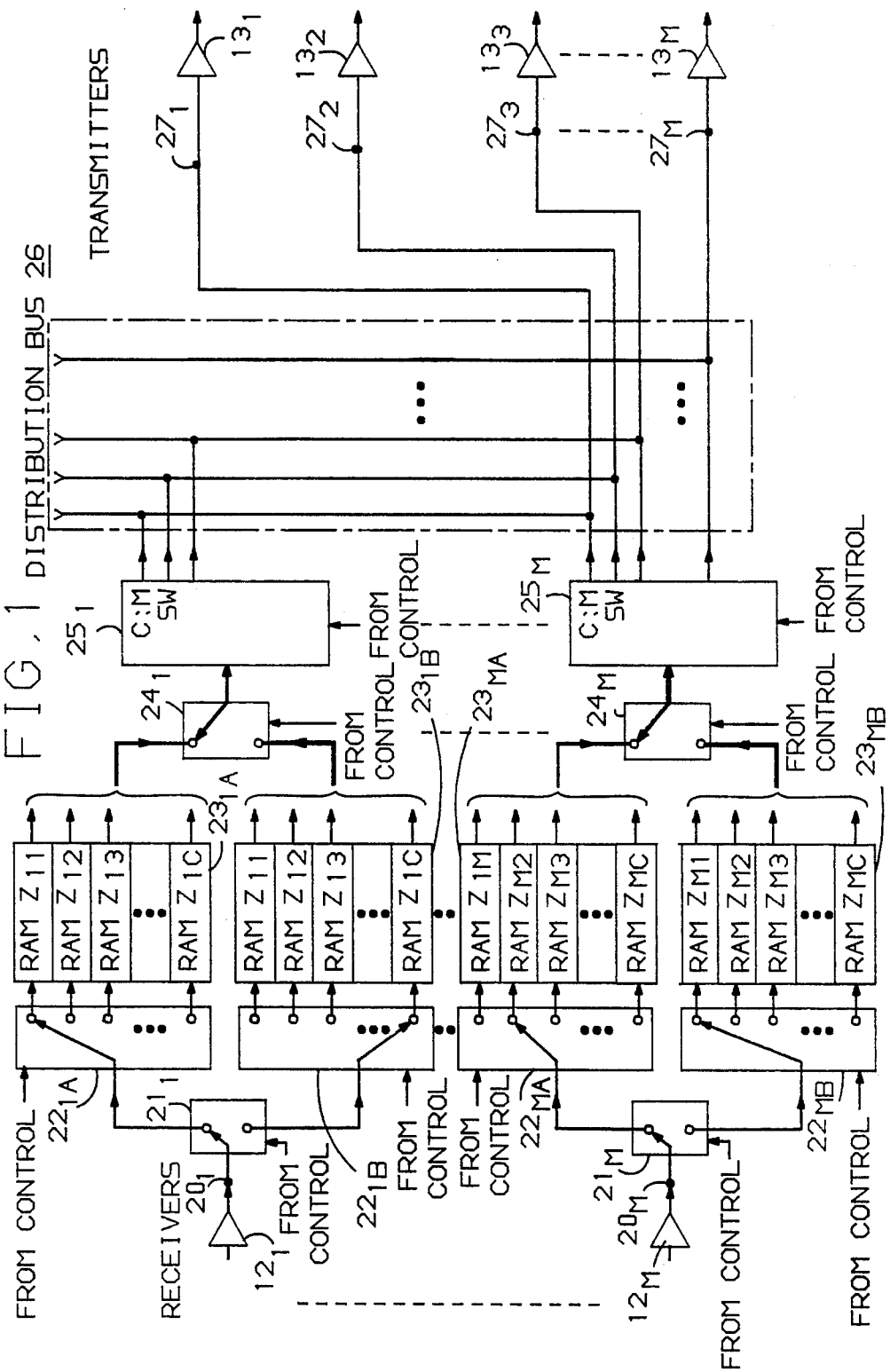
FIG. 1 is a block diagram of an exemplary $M \times M$ baseband digital switch for use in a TDMA communication system.
Figure 2:
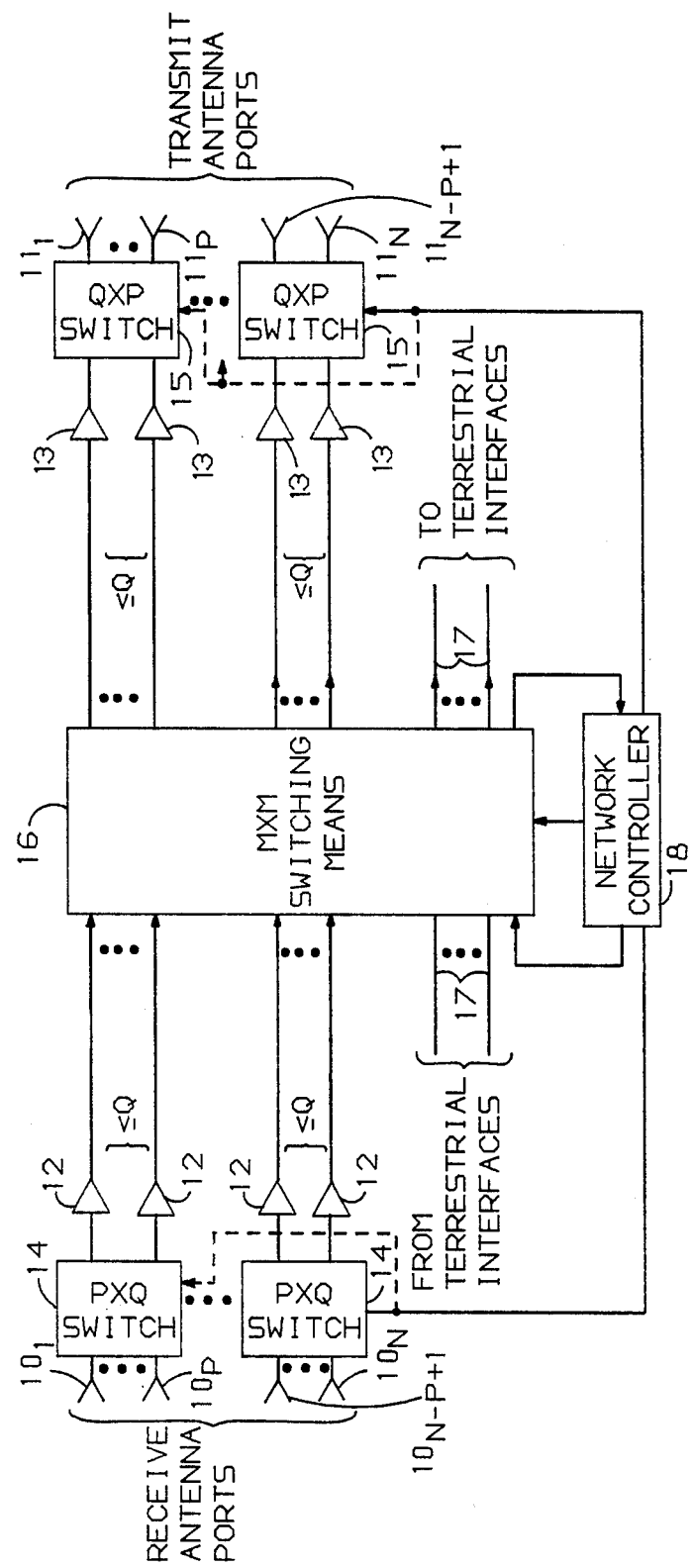
FIG. 2 is a block diagram of an exemplary base station switching hierarchy for using the switch of FIG. 1.

FIG. 1 is a block diagram of an exemplary $M \times M$ switching arrangement in accordance with the present invention which implements a fast assignment technique or algorithm which will be discussed in detail hereinafter. FIG. 2 is a block diagram of an exemplary switching hierarchy as might be found in, for example, a central base station of a multiple beam radio communication system which is capable of blanketing a service region with a contiguous raster of narrow beams for providing wideband interconnections among remote stations or service areas dispersed over a geographical area. For purposes of understanding the present invention, the centrally located base station of FIG. 2 will be considered hereinafter as being capable of communicating with the remote stations or areas using the well-known Time-Division-Multiple-Access (TDMA) technique. It is to be understood that although such communication technique is a preferred technique for implementing the present invention, it is used primarily hereinafter for purposes of exposition and not for purposes of limitation since it is possible for other techniques such as, for example, Frequency-Division-Multiple-Access (FDMA) to be used.

In the arrangement of FIG. 2, it will be assumed hereinafter that each beam position associated with a particular separate remote station or service area is served by two dedicated feedhorns, one to receive and one to transmit, with different frequencies used for each to reduce interference. In an N beam system, the plurality of N receive feedhorns are designated $10_1$ to $10_N$ and the corresponding plurality of N transmit feedhorns are designated $11_1$ to $11_N$. The relatively large number N of feedhorns are arranged, for example, in equal-sized groups of P feedhorns, and each group of P receiving and transmitting feedhorns 10 and 11 is connected to a smaller number (Q) of one or more receivers 12 and transmitters 13, respectively, via a separate respective P×Q receive antenna port switch 14 and Q×P transmit antenna port switch 15. The receive and transmit antenna port switches 14 and 15 are physically distinct and operate independently under the control of a Network Controller 18 and, for purposes of explanation hereinafter, each port switch supports the same number of P feedhorns.

It will be assumed that all transmitters/receivers 13/12 operate at a common channel data rate of, for example, 50 Megabit/second. Each receiver 12 demodulates the received signal to baseband and regenerates it, while each transmitter 13 modulates the digital data stream onto the carrier. The number of Q receivers 12 and Q transmitters 13 assigned to an associated group of P receiver feedhorns 10 and P transmitter feedhorns 11, respectively, and associated with a particular respective receive antenna port switch 14 or transmit antenna port switch 15, is proportional to the total amount of traffic presented by the beam positions served by the associated group of feedhorns. For example, a group of P feedhorns serving lightly loaded beams is assigned only one transmitter/receiver pair while a group of P feedhorns presenting a factor of K greater traffic than the light loaded group is assigned K transmitter/receiver pairs where K is equal to or less than P. The receivers 12 and transmitters 13 provide a TDMA mode of service such that remote stations in the various beams are connected via the port switches 14 and 15, respectively, to the associated receivers 12 and transmitters 13 in a repetitive time division manner.

Figure 3:
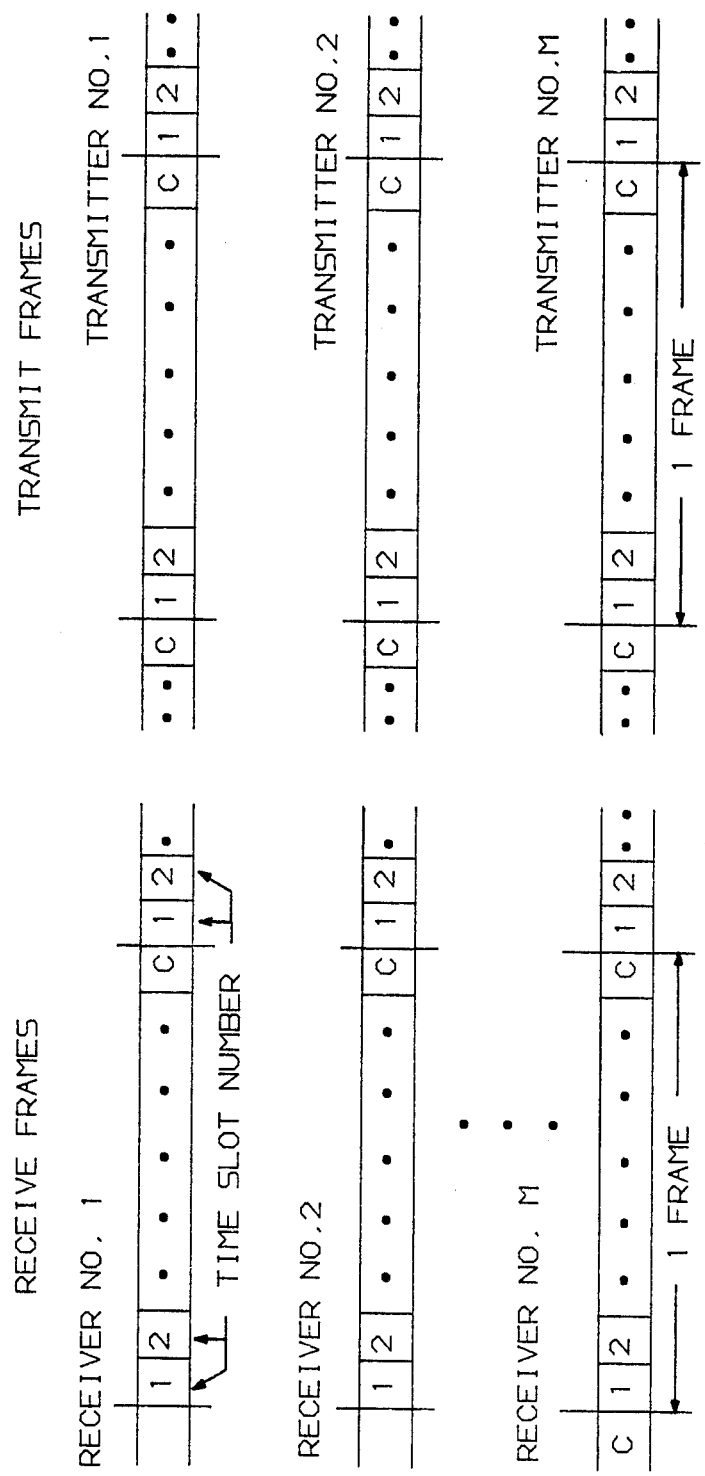
FIG. 3 is an exemplary time sequence of M concurrent receive and transmit frames of a TDMA switching system using the $M \times M$ switch of FIG. 1.

As shown in exemplary TDMA Frame arrangements in FIG. 3, each repetitive TDMA frame provides C time slots, and there is one such frame associated with each transmitter/receiver 13/12 pair. The number of time slots allocated to each user at a remote station is dependent upon the traffic demand of that user, up to the full transceiver capacity C.

For purposes of illustration, it will be assumed that there are a plurality of M transmitter/receiver 13/12 pairs. These transmitter/receiver pairs are interconnected with one another by means of an M×M centrally located time division switching means 16. It is to be understood that the present central station can also be used as a central station for a plurality of N terrestrial wire lines or some combination of radio and wire line terminations that do not exceed N. For the terrestrial wire lines, feedhorns 10 and 11 would not be required and the wire lines can be terminated directly on the corresponding terminals of the receive and transmit port switches 15 and 14, respectively. Alternatively, as shown in FIG. 2, where the central switching means 16 operates at a channel data rate of the exemplary 50 Mb/s, and is configured C times every TDMA frame, then, wire lines 17 can be terminated on central switching means 16. No more than a full compliment of M 50 Mb/s ports can be provided on central switching means 16, with each wire line 17 input port being a properly formatted terrestrial wire line so that the wire lines appear to central switching means 16 as an additional transmitter/receiver pair. For purposes of simplicity hereinafter, it will be assumed that no terrestrial wire line connections are present, although it is apparent that the same approach can be used when such connections are to be made.

It is well known that each TDMA time slot corresponds to some fixed rate one-way connection between two remote stations. The traffic among N beams positions can be represented by a traffic matrix T:

$$\underline{T} = \begin{matrix} t_{1,1} & t_{1,2} & \cdots & t_{1,N} \\ \cdot & \cdot & & \cdot \\ \cdot & \cdot & & \cdot \\ \cdot & \cdot & & \cdot \\ t_{N,1} & t_{N,2} & \cdots & t_{N,N} \end{matrix} \qquad (1)$$

where $t_{ij}$ represents the traffic, in time slots, arising within beam i and destined for beam j. The elements of matrix T may vary with time as the beam-to-beam connection patterns change. However, the following conditions must always be true:

$$R_i = \sum_{j=i}^{N} t_{ij} \leq C, i = 1, 2, \ldots, N \qquad (2)$$

$$S_j = \sum_{i=1}^{N} t_{ij} \leq C, j = 1, 2, \ldots, N \qquad (3)$$

$$\sum_{i=1}^{N} \sum_{j=1}^{N} t_{ij} \leq MC. \qquad (4)$$

Equation (2) defines that the total traffic arising in beam position i cannot exceed the number of time slots C within one frame. Similarly, Equation (3) defines that the total traffic into beam j cannot exceed the number of time slots in one frame. Finally, equation (4) defines that the total traffic cannot exceed the total capacity of all M transmitter/receiver pairs.

If it is possible to connect any receiver to any beam and any transmitter to any beam, then equations (2) to (4) are sufficient conditions guaranteeing the existence of a nonconflicting TDMA assignment to the M transmitter/receiver pairs. Essentially, if equations (2) to (4) are satisfied, then T can be represented as the sum of C N×N matrices, each having M non-zero elements all equal to unity with no non-zero element sharing the same row or column with any other. The M non-zero elements in each such N×N matrix correspond to the M beam pairs that may be interconnected by the M transmitter/receiver pairs in any time slot of the frame.

Referring to FIG. 2, it is seen that additional constraints are imposed upon traffic matrix T, namely, that the sum of the traffic presented by any group of beams cannot exceed the capacity, in time slots, of the specific number of transmitter/receiver pairs assigned to that group. Any resulting TDMA assignment must assure that in every time slot, each group must nonconflictingly transmit and receive a number of times equal to the number of transmitter/receiver pairs allocated to that group, which to date has not been shown to be possible. Secondly, even without these additional constraints, the actual process of assigning from the matrix is a very difficult task, and the technique's execution time would limit the ability to rapidly update the assignment in response to changing traffic patterns. Finally, although the less constrained situation guarantees the existence of a nonconflicting assignment, it is possible that the particular M beam pair positions assigned to any time slot may interfere with each other, either as a result of multiple reflections from, for example, buildings, or as a sidelobe leakage during rain fade events when received and transmitted power levels may be altered.

To overcome these three problems, the present arrangement does not instantaneously discharge packets of information arriving in given time slots of the incoming frames into the same time slots of the outgoing frames. Rather, the packets arriving in any one frame are temporarily stored for subsequent transmission in the next frame. With such technique, it is also permissible to rearrange the time slot assignments of the various packets. More particularly, in accordance with the present technique, users are assigned in a nonconflicting manner to the TDMA frames inbound to the central base station, storing these arriving packets in memory as they arrive. These stored packets are then assigned for nonconflicting retransmission in the next frame interval of the outbound frames in a manner which also promotes minimal interference by scheduling packets for interfering stations in different time slots of a frame period. These inbound and outbound frame assignments are repetitive until updated as mandated by changing traffic patterns.

In accordance with the present assignment technique, traffic inbound to the base station may be represented by the N×1 column vector R:

$$\underline{R} = \begin{matrix} R_1 \\ \vdots \\ R_N \end{matrix} \quad (5)$$

where, from equation (2), $R_i$ is the total incident traffic of beam i, i=1, ..., N. The beams are partitioned in G groups all containing P=N/G beams and $K_g \leq P$ base station receivers are allocated to group g, g=1, ..., G. Since there are a total of M receivers, $$\sum_{g=1}^{G} K_g = M. \quad (6)$$

For an assignment to exist, it is necessary that equation (2) be satisfied for all i, equation (4) be satisfied, and also that $$\sum_{i=(g-1)P+1}^{gP} R_i \leq K_g C, \; g = 1, \ldots, G. \quad (7)$$

Equation (7) is an expression of the fact that the total traffic offered by the P beams in group g cannot exceed the capacity of the $K_g$ receivers assigned to group g.

Suppose that equation (7) is satisfied with equality, since it is always possible to add dummy traffic without violating equations (2) or (4), then there always exists at least $K_g$ non-zero elements of R belonging to group g, and not more than $K_g$ elements of R belonging to group g may equal C exactly. It can then be said that it is possible to assign traffic from R to the M receivers. In accordance with the present technique, for each group, select $K_g$ elements including all those summing to C exactly. One unit of traffic may be removed from each element selected; the M units so removed, arising in different beams, may be assigned in a nonconflicting manner to the first time slot of the M inbound frames such that $K_g$ units are assigned to the $K_g$ receivers serving the group g. The remaining elements in R have the property that no element exceeds C−1, the sum of the elements for group g equals $K_g(C−1)$, and all elements sum to M(C−1). Furthermore, there remain C−1 unassigned time slots in each inbound frame.

An exemplary reduction of the vector R and the resulting assignment is shown in FIGS. 4 and 5, with beams numbered sequentially from top to bottom. Each frame will be considered to contain 5 time slots, (C=5), and there are 9 beams (N=9) partitioned into three groups. Group 1 offers five units of traffic and is served by one receiver ($K_1=1$), group 2 offers 10 units of traffic and is served by two receivers ($K_2=2$) and group 3 offers 10 units of traffic and is served by two receivers ($K_2=2$). There are a total of $K_1+K_2+K_3=5$ receiving frames. Proceeding from left to right in FIG. 4 are the vectors of unassigned traffic remaining as the assignment progresses. Shown in circles are the elements from which single units of traffic are extracted while proceeding with the assignment. Starred elements correspond to those which must be chosen for the assignment to proceed and is equal in value to the remaining number of unassigned time slots in each frame. FIG. 5 shows the resulting frame assignments with the number shown in each time slot of a frame corresponding to the beam assigned to transmit in that time slot.

The above approach results in traffic being successfully received at the central base station. In accordance with the present invention, all traffic arriving in a particular frame is stored in a memory at the central base station, and assignment of this traffic to subsequent outgoing frames is then made. For this purpose, consider the 1×N row vector S:

$$S = [S_1, S_2 \ldots S_N] \quad (8)$$

with elements $S_j$ defined in Equation (3). Proceeding in an identical manner to that just described in FIGS. 4 and 5 for inbound traffic, a similar outbound traffic assignment can be shown to exist.

FIG. 1 shows an exemplary hardware architecture of the M×M switching means 16 of FIG. 2 in accordance with the present invention for switching baseband digital signals. Each of the M input ports $20_1$ to $20_M$ accepts a continuous sequence of packets from receivers $12_1$ to $12_M$, respectively, at the full transmission rate, e.g., 50 Mb/sec. For example, for input $20_1$, the packet sequence is shown as being routed through a single pole/double throw (SP/DT) switching means $21_1$ which alternates between its two positions at the TDMA frame rate. More particularly, switching means $21_1$ stays in one fixed position throughout a full TDMA frame period and then switches to its alternate position for the next full frame period.

For purposes of illustration, it is assumed that switching means $21_1$ is in the upper position as shown in FIG. 1, and all packets are passed to the input of second switching means $22_{1A}$. Unlike switching means $21_1$, second switching means $22_{1A}$ is driven by the TDMA time-slot clock so that successive packets are loaded into memories labeled $Z_{ij}$ of memory module $23_{iA}$, where i designates the input port (1−M) and j varies from 1 to C representative of the total number of packets, or time slots, in a TDMA frame. Each memory $Z_{ij}$ of memory module 23 holds a packet from a specific remote station destined for another remote station. This operation goes on simultaneously for each of the M parallel inputs $20_1$ to $20_M$ resulting in all the incoming data packets being stored in the memories $Z_{ij}$ of memory module $23_{iA}$. At the end of the TDMA frame, the memory loading operation into memory modules $23_{iA}$ is complete and switches $21_1$ to $21_M$ are switched to the alternate position to cause the packets from the next frame period to be written into the memories $Z_{ij}$ of memory modules $23_{iB}$.

During this next frame period, those packets already stored in memories $Z_{ij}$ of memory modules $23_{iA}$ are unloaded in a parallel manner through third switching means $24_1$ to $24_M$, which are in the upward position as shown in FIG. 1, and to C:M switches $25_1$ to $25_M$, respectively, C:M switches $25_i$ are driven at the TDMA time-slot clock rate. The function of third switching means $24_i$ is simply to select either one of memory modules $23_{iA}$ or $23_{iB}$ in alternating TDMA frames, and C:M switches $25_i$ function to route the packets to their proper output port $27_1$ to $27_M$ and the associated transmitter 13 in a predetermined sequence via an output distribution bus 26. Both the storage of inbound packets and the distribution of outbound packets are under the control of a network controller 18 shown in FIG. 2 which can use, for example, clock signals and a table look-up capability for achieving the switching functions as is well known in the art.

For illustrative purposes, the output distribution bus 26 is functionally shown as a bus of M parallel wires with each wire terminating in a separate one of the M transmitters 13. For example, if a packet in memory $Z_{12}$ in memory module $23_{1A}$ is scheduled to go to transmitter $13_3$ in a particular time slot, this memory location will be connected by C:M switch $25_1$ to wire 3 of bus 26 terminating in transmitter $13_3$ during the proper time slot. It is to be understood that although all of memories $Z_{ij}$ of the M memory modules $23_{iA}$ are read out in parallel during a frame period, C:M switches $25_1$ to $25_M$ can direct up to M packets onto separate wires of bus 26 in each time slot from anywhere within the memories $Z_{ij}$, and these packets are always distributed among the M wires of bus 26 without any collision. As can be seen from FIG. 1, since C packets from each memory module 23 are concurrently available at the C inputs of the associated C:M switch $25_i$, such switch can direct one or more packets onto separate wires of bus 26 during any time slot period if the N×N traffic matrix reduction indicated such assignment.

Figure 6:
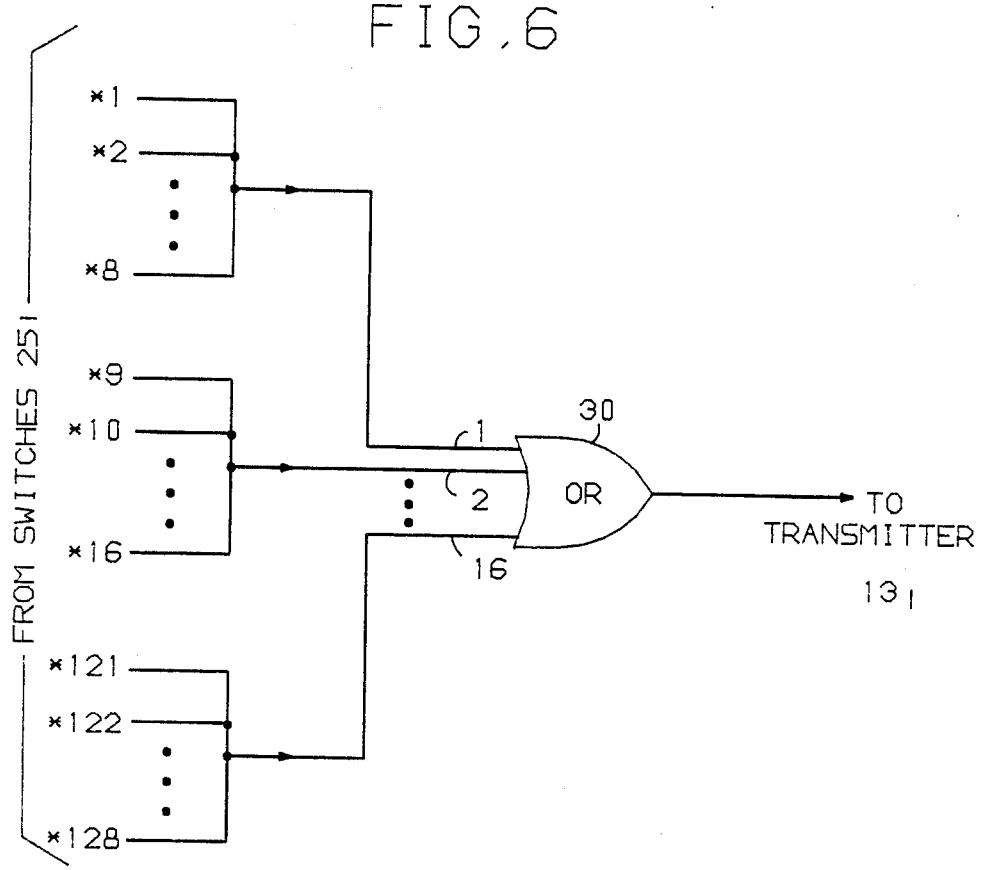
FIG. 6 is an exemplary implementation of one bus line of the distribution bus of FIG. 4 for the condition where $M=128$.

Regarding distribution bus 26, the functional representation in FIG. 1 shows a wired-OR arrangement whereby for each output wire terminating in a specific transmitter 13 there are exactly M input wires connected to it, each from a different C:M switch 25. Such an arrangement is practical for M not larger than, for example, 8. For M as large as, for example, 128, 8 lines from 8 different switches 25 must be grouped in a wired-OR manner and then 16 of these groups are combined with an OR gate 30 to accomplish the required function as shown in FIG. 6. M identical sets of the arrangement of FIG. 6 would complete the entire bus 26.

Figure 7:
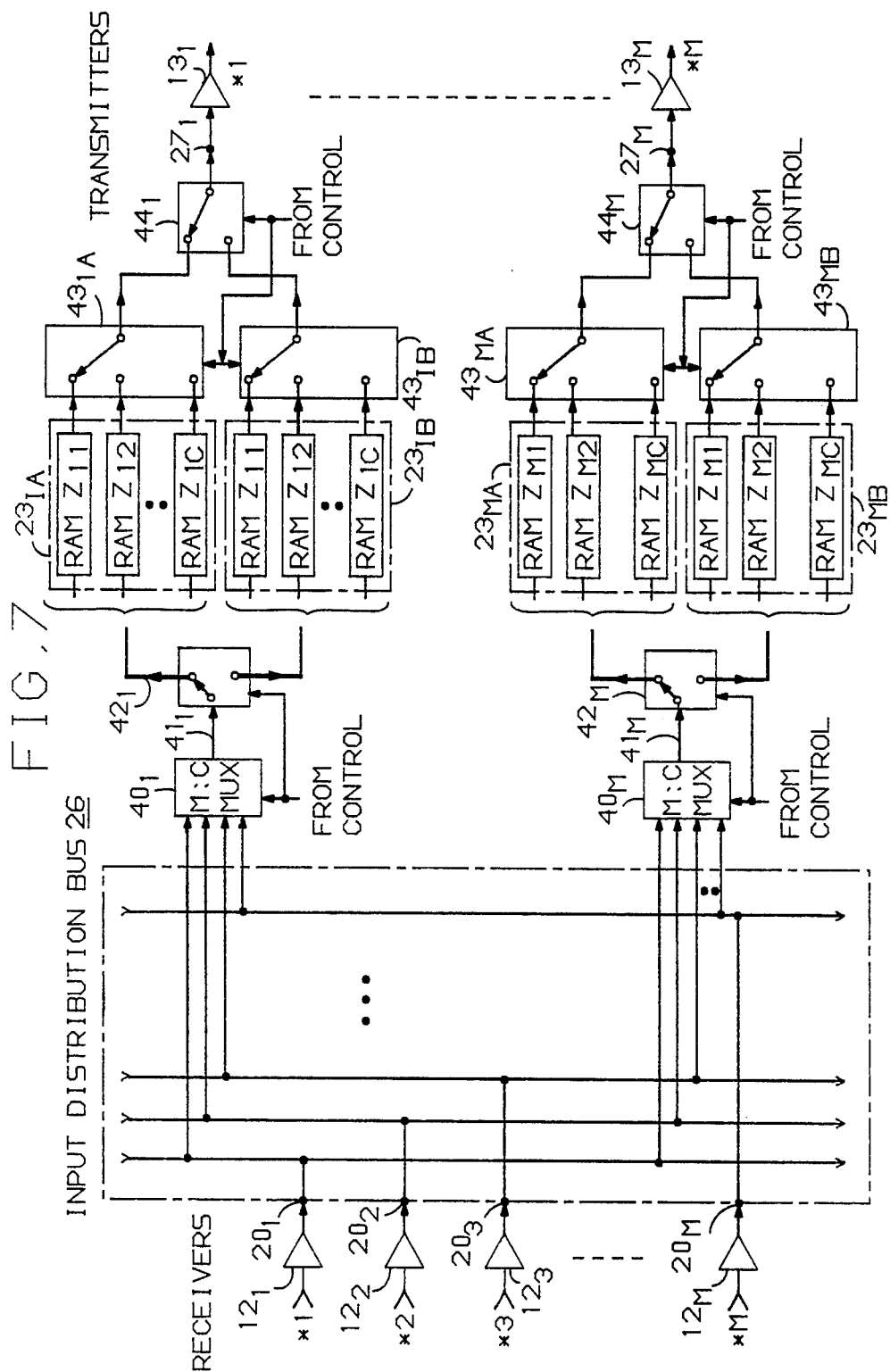
FIG. 7 is an alternative arrangement of the $M \times M$ switch of FIG. 1.

If bit synchronization is available at the inputs to M×M switching means 16, then an alternative configuration as shown in FIG. 7 is possible. Each of the M received data streams is connected to a separate wire of bus 26 and the M wires together carry all the M-channel data simultaneously. As Network Controller 18 makes the incoming and outgoing traffic assignments, it assigns a memory location to each incoming packet in such a way that the desired outbound transmissions can be obtained by sequentially reading out the contents of each memory location $Z_{ij}$ in each memory module 23. More particularly, for transmitter $13_1$, the M packets in each time slot are concurrently received at the M inputs to an M:C switch $40_1$. M:C switch $40_1$ functions to direct the correct packet(s) in each time slot from bus 26 to the output bus $41_1$ and through switching means $42_1$ for storage in the appropriate memory location $Z_{ij}$ of memory module $23_{1A}$.

During the next frame, switching means $42_1$ moves to its alternate position to load memories $Z_{ij}$ of memory module $23_{1B}$. While memory module $23_{1B}$ is being loaded, switch $43_{1A}$ functions to deliver the packets stored in memory locations $Z_{11}$ to $Z_{1C}$ in a predetermined order for transmission to transmitter $13_1$ via single pole-double throw switching means $44_1$. It is to be understood that the operation of switches 40, 42, 43 and 44, and memory modules 23, is under the control of Network Controller 18 in the manner indicated for the components of FIG. 1.

It is to understood that the above-described embodiments are simply illustrative of the principles of the invention. Various other modifications and changes may be made by those skilled in the art which will embody the principles of the invention and fall within the spirit and scope thereof. For example, the present invention could be used in a Frequency Division Multiple Access (FDMA) communication system. For such system, in FIG. 1, second switching means $22_i$ could be a channel dropping filter which directs each of C concurrently received channels in separate frequency bands into a separate one of the C memories in each associated memory module 23 dependent on the position of switching means 21. Distribution bus 26 would contain M buses, each containing C wires which carry the C separate frequency band channels associated with a transmitter 13. Switch 25 would then comprise a C:CM switch to direct each of the 1−C packets onto the proper 1−C wires, respectively, associated with the M buses of distribution bus 26 so that each packet is delivered to the appropriate transmitter 13 for modulation with the appropriate carrier.

What is claimed is:

1. A switching arrangement comprising:

a plurality of M input ports ($20_1$–$20_M$) for receiving M separate input signals, each input signal comprising a plurality of C separate packets of information formatted in a first arrangement of C channels received during a predetermined period of time;

a plurality of M output ports ($27_1$–$27_M$);

a memory comprising a first and a second section ($23_{iA}$ and $23_{iB}$), each section including a plurality of C-by-M memory locations;

a distribution arrangement (18,21,22,24–26, FIG. 1; 18,26,40–42,43–44, FIG. 7) for directing the C separate packets of information received at each input during sequential ones of the predetermined periods of time alternately into the first section and then the second section of the memory, while concurrently directing the C-by-M separate packets of information stored in the first or second memory section during an immediately prior predetermined time period to the M output ports in a predetermined sequence of M concurrent packets for formatting each of the M output signals in a second arrangement of C channels, the M concurrent packets being capable of including more than one packet of information from a particular input port for transmission to separate ones of the M output ports;

a plurality of M receivers (12), each receiver including an output terminal connected to a separate one of the M input ports and an input terminal; and an N-by-M switching means for directing N input signals concurrently received during each predetermined time period to the input terminals of the plurality of M receivers, each input signal comprising C packets of information, and the N-by-M switching means comprises a plurality of separate P-by-Q switches (14) with each P-by-Q switch receiving a separate group of P of the N input signals and directing the packets of information received in the associated P input signals to the input terminals of a separate group of Q receivers forming part of the plurality of M separate receivers, where $N > P$ and Q is dependent on the number of C packets of information included in the group of associated P input signals during the predetermined period of time and is equal to or less than P.

2. A switching arrangement comprising:

a plurality of M input ports for receiving M separate input signal, each input signal comprising a plurality of C separate packets of information formatted in a first arrangement of C channels received during a predetermined period of time;

a plurality of M output ports;

a memory comprising a first and a second section, each section including a plurality of C-by-M memory locations;

a distribution arrangement for directing the C separate packets of information received at each input during sequential ones of the predetermined periods of time alternately into the first section and then the second section of the memory, while concurrently directing the C-by-M separate packets of information stored in the first or second memory section during an immediately prior predetermined time period to the M output ports in a predetermined sequence of M concurrent packets of information for formatting each of the M output signals in a second arrangement of C channels, the M concurrent packets being capable of including more than one packet of information from a particular input port for transmission to separate ones of the M output ports;

a plurality of M transmitters, each transmitter including an input terminal connected to a separate one of the M output ports and an output terminal; and an M-by-N switching means for directing concurrent outputs appearing at the output terminals of the plurality of M transmitters to predetermined ones of a plurality of N output signals, each output from a transmitter output terminal comprising packets of information in the second arrangement of C channels, and the M-by-N switching means comprises a plurality of separate Q-by-P switches, each Q-by-P switch receiving a separate group of Q signals from the output terminals of an associated group of Q transmitters forming part of the plurality of M transmitters and directing the associated group of Q signals to P separate output signals forming part of the plurality of N output signals, where $N > P$ and Q is dependent on the number of C packets of information included in the group of Q output signals during the predetermined period of time and is equal to or less than P.

3. A switching arrangement according to claim 2 wherein the switching arrangement further comprises:

a plurality of M receivers (12), each receiver including an output terminal connected to a separate one of the M input ports and an input terminal; and an N-by-M switching means for directing N input signals concurrently received during each predetermined time period to the input terminals of the plurality of M receivers, each input signal comprising C packets of information, and the N-by-M switching means comprises a plurality of separate P-by-Q switches (14) with each P-by-Q switch receiving a separate group of P of the N input signals and directing the packets of information received in the associated P input signals to the input terminals of a separate group of Q receivers forming part of the plurality of M separate receivers, where $N > P$ and Q is dependent on the number of C packets of information included in the group of associated P input signals during the predetermined period of time and is equal to or less than P.

4. A switching arrangement according to claim 1 wherein the switching arrangement further comprises:

a plurality of M transmitters (13), each transmitter including an input terminal connected to a separate one of the M output ports and an output terminal; and an M-by-N switching means for directing concurrent outputs appearing at the output terminals of the plurality of M transmitters to predetermined ones of a plurality of N output signals, each output from a transmitter output terminal comprising packets of information in the second arrangement of C channels, and the M-by-N switching means comprises a plurality of separate Q-by-P switches (15), each Q-by-P switch receiving a separate group of Q signals from the output terminals of an associated group of Q transmitters forming part of the plurality of M transmitters and directing the associated group of Q signals to P separate output signals forming part of the plurality of N output signals, where $N > P$ and Q is dependent on the number of C packets of information included in the group of Q output signals during the predetermined period of time and is equal to or less than P.

5. A switching arrangemnent according to claim 1, 3, 4 or 2, the distribution arrangement comprising:

first switching means (21,22, FIG. 1; 26,40,42, FIG. 7) for directing the C packets of information received in the first arrangement of C channels from each of the plurality of M input ports to a separate memory location of the first section or second section of the memory during each predetermined period of time; and second switching means (24,25,26, FIG. 1, 43,44, FIG. 7) for directing each separate group of C packets of information that was stored in either one of the first and second sections of memory during a previous predetermined period of time to the appropriate output ports of the switching arrangement for forming a second arrangement of C channels at each output port.

6. A switching arrangement according to claim 5 wherein the first switching means (21,22) directs the C packets of information received at each of the M input ports of the switching arrangement into C associated memory locations of either one of the first section or second section of memory during each predetermined period of time; and the second switching means (24,25) directs the packets of information, stored for the M input ports in either one of the first section or second section of memory by the first switching means during a previous predetermined period of time, to appropriate ones of the M output ports of the switching arrangement in groups of M concurrent packets of information at a time to form the second arrangement of C channels at each output port.

7. A switching arrangement according to claim 5 wherein the first switching means (40,42) directs C packets of information associated with each output port of the switching arrangement, and received at the M input ports during the predetermined period of time, into C associated memory locations of either one of the first section or second section of memory; and the second switching means (43,44) directs each group of C packets of information associated with a separate one of the M output ports, which was stored in the C associated memory locations of the first section or second section of the memory during a previous predetermined period of time, to the associated output port in the second arrangement of C channels.

8. A method of assigning the non-uniform traffic requirements between each of the grouped pairs of of a plurality of N remote service areas to each of a plurality of M inputs and outputs of a switching arrangement, where M<N and each of the M inputs and outputs of the switching arrangement comprises a plurality of C packets of information in a predetermied period of time, the method comprising the steps of:

(a) representing the system traffic requirements by an N-by-N matrix having the form $$\underline{T} = \begin{matrix} t_{1,1} & t_{1,2} & \cdots & t_{1,N} \\ \vdots & & & \vdots \\ t_{N,1} & t_{N,2} & \cdots & t_{N,N} \end{matrix} \quad (1)$$

where the individual elements $t_{ij}$ in the matrix represent units of traffic originating in service area i and destined for service area j;

(b) summing each of the rows and columns of the traffic matrix of step (a) to form N separate input elements, R, and N separate output elements, S, respectively, of a respective overall input and output vector such that $$R_i = \sum_{j=i}^{N} t_{ij} \leq C, i = 1, 2, \ldots, N \quad (2)$$

$$S_j = \sum_{i=1}^{N} t_{ij} \leq C, j = 1, 2, \ldots, N \quad (3)$$

$$\sum_{i=1}^{N} \sum_{j=1}^{N} t_{ij} \leq MC \quad (4)$$

(c) subdividing the plurality of N input elements and N output elements into subgroups of P input and output elements, each subgroup being associated with a separate number Q of the plurality of M inputs or M outputs of the switching arrangement depending on the total of C units of traffic associated with each subgroup of the input or output elements, where Q is equal to or less than P;

(d) removing Q associated units of traffic from each of the subgroups of the input or output elements, including those elements which equal C, regardless of orientation or destination, and assigning the Q units of traffic to separate ones of the Q associated inputs or outputs, respectively, of the switching arrangement during a predetermined subperiod of the predetermined period of time;

(e) reducing each of the input elements or output elements from which a unit of traffic was taken in step (d) by one unit; and (f) reiterating steps (d) and (e) C−1 times wherein the value of C used in the reiteration of step (d) shall equal C−x, where x is the number of times step (d) is reiterated.

9. The method of assigning the non-uniform traffic requirements according to claim 8 wherein the method comprises the further steps of:

(g) performing steps (c) to (f) for the N input elements to provide each of the M inputs to the switching arrangement with C packets of information in a first arrangement of packets of information during the predetermined period of time;

(h) performing steps (c) to (f) for the N output elements to provide each of the M outputs of the switching arrangement with C packets of information in a second arrangement of packets during the predetermined period of time;

(i) causing the switching arrangement to store the M inputs to the switching arrangement in accordance with the first arrangement of packets of information as determined in step (g) during a first predetermined period of time; and (j) causing the switching arrangement to read out to the M output of the switching arrangement the packets of information stored during step (i) during a next predetermined period of time in a manner to obtain the second arrangement of packets at the M outputs of the switching arrangement.

10. The method of assigning non-uniform traffic requirements according to claim 8 or 9 wherein the method comprises the further steps of:

(k) in performing step (d), avoiding taking two units of traffic from the input or output elements which would cause interference above a predetermined level when packets of information are received from, or transmitted to, the service areas associated with the two units of traffic taken.

* * * * *